(12) United States Patent
Hynick

(10) Patent No.: US 6,533,142 B1
(45) Date of Patent: Mar. 18, 2003

(54) AUTOMATED TANKER UNLOADING SYSTEM

(76) Inventor: Andrew T. Hynick, 1617 S. Dover Rd., Dover, FL (US) 33527

( * ) Notice: Subject to any disclaimer, the term of this patent is extended or adjusted under 35 U.S.C. 154(b) by 0 days.

(21) Appl. No.: 10/124,643

(22) Filed: Apr. 17, 2002

(51) Int. Cl.⁷ .................................................. B07D 5/08
(52) U.S. Cl. ......................... 222/61; 222/136; 222/504; 222/608
(58) Field of Search ................................ 222/608, 136, 222/61, 504; 406/137

(56) References Cited

U.S. PATENT DOCUMENTS 4,131,214 A * 12/1978 Rogers ........................ 222/136
6,276,826 B1 * 8/2001 Rumph ........................ 406/137

* cited by examiner

Primary Examiner—Philippe Derakshani

(57) ABSTRACT

An automated tanker unloading system has a plurality of electronically controlled valves to control gas pressure within a tanker trailer and to control the delivery of product. A plurality of electronic gas pressure transducers sense internal gas pressure within individual hoppers of the trailer and sense internal gas pressures within a hot hose and a product hose and convert the sensed gas pressure into an electronic signal. A plurality of pressure carrying pipes transmit positive and negative pressures between the valves and the hoppers and the product hoses and the hot hose. A processor is programmed to analyze electronically inputted data from the transducers and to then send signals to control the valve functions.

2 Claims, 4 Drawing Sheets

AUTOMATED TANKER UNLOADING SYSTEM

BACKGROUND OF THE INVENTION

1. Field of the Invention

The present invention relates to an automated tanker unloading system and more particularly pertains to safely and efficiently controlling tanker unloading.

2. Description of the Prior Art

The use of tanker unloading systems of known designs and configurations is known in the prior art. More specifically, tanker unloading systems of known designs and configurations previously devised and utilized for the purpose of controlling tanker unloading are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 833,761 to Stevens discloses a means for causing the movement of granular and like material. U.S. Pat. No. 2,931,523 to Nelligan discloses a self-unloading compartment. U.S. Pat. No. 3,747,811 to Lewis et al discloses an agitator for facilitating flow from hopper. U.S. Pat. No. 4,244,403 to Legleiter discloses an apparatus for transferring liquid between a reservoir and a mobile tank truck. U.S. Pat. No. 5,592,754 to Krieder et al discloses an electronic control of compressor unloader and air dryer purge. U.S. Pat. No. 5,702,221 to Sridhar discloses a materials handling system. U.S. Pat. No. 5,986,597 to Stemporzewski, Jr., et al discloses a fluid transfer controller with digital bitstream monitor. Lastly, U.S. Pat. No. 6,244,287 to Hill et al discloses a system and method for dynamically purging cargo tank wet lines.

While these devices fulfill their respective, particular objectives and requirements, the aforementioned patents do not describe an automated tanker unloading system that allows controlling tanker unloading safely and efficiently.

In this respect, the automated tanker unloading system according to the present invention substantially departs from the conventional concepts and designs of the prior art, and in doing so provides an apparatus primarily developed for the purpose of controlling tanker unloading safely and efficiently.

Therefore, it can be appreciated that there exists a continuing need for a new and improved automated tanker unloading system which can be used for controlling tanker unloading safely and efficiently. In this regard, the present invention substantially fulfills this need.

SUMMARY OF THE INVENTION

In view of the foregoing disadvantages inherent in the known types of tanker unloading systems of known designs and configurations now present in the prior art, the present invention provides an improved automated tanker unloading system. As such, the general purpose of the present invention, which will be described subsequently in greater detail, is to provide a new and improved automated tanker unloading system and method which has all the advantages of the prior art and none of the disadvantages.

To attain this, the present invention essentially comprises a tractor. The tractor is equipped to provide airflow and pressure through a pressure feed pipe known as a hot hose. A tanker trailer is next provided. The trailer has a plurality of hoppers. The trailer is suited to haul dried granular material known as product. The trailer is equipped with a gas pressurization system for each of the plurality of hoppers contained within the tanker. The tanker also has a discharge piping system, known as a product hose, for carrying the product from the hopper to a storage area. Next provided is a plurality of electronically controlled valves. The valves control gas pressure within a tanker trailer and control the delivery of the product. Each of the valves performs one function from a group of functions. The valves and their functions include a blow down valve, an aeration valve, an air product flow valve, and one of a plurality of hopper discharge valves. A plurality of electronic gas pressure transducers are next provided. The transducers sense internal gas pressure within the individual hoppers of the trailer and sense internal gas pressures within the hot hose and the product hose and convert the sensed gas pressure into an electronic signal. Next provided are a plurality of pressure carrying pipes. The pipes transmit positive and negative pressures between the valves and the hoppers and the product hoses and the hot hose. A processor is next provided. The process is programmed to analyze electronically inputted data from the transducers and to then send signals to control the valve functions. An electronic coupling means is next provided. The transducers and the processor are coupled allowing electronic signals from the transducers to be transmitted to the processor. The coupling means also couples the processor and the valves thereby allowing the processor to control the function of the valves according to the installed program in the processor. Finally, a control box is provided. The control box is fabricated of rigid material. The control box has five closed sides. The control box also has a pivotally mounted sixth side for allowing the opening and closing of the control box. The box houses a plurality of components of the system.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved automated tanker unloading system which has all of the advantages of the prior art tanker unloading systems of known designs and configurations and none of the disadvantages.

It is another object of the present invention to provide a new and improved automated tanker unloading system which may be easily and efficiently manufactured and marketed.

It is further an object of the present invention to provide a new and improved automated tanker unloading system which is of durable and reliable constructions.

An even further object of the present invention is to provide a new and improved automated tanker unloading system which is susceptible of a low cost of manufacture with regard to both materials and labor, and which accordingly is then susceptible of low prices of sale to the consuming public, thereby making such automated tanker unloading system economically available to the buying public.

Even still another object of the present invention is to provide a automated tanker unloading system for controlling tanker unloading safely and efficiently.

Lastly, it is an object of the present invention to provide a new and improved automated tanker unloading system having a plurality of electronically controlled valves to control gas pressure within a tanker trailer and to control the delivery of the product, a plurality of electronic gas pressure transducers to sense internal gas pressure within individual hoppers of the trailer and sense the internal gas pressures within a hot hose and product hoses and convert the sensed gas pressure into an electronic signal, a plurality of pressure carrying pipes to transmit positive and negative pressures between the valves and the hoppers and the product hoses and the hot hose, a processor programmed to analyze electronically inputted data from the transducers and to then send signals to control the valve functions.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

With the exception of the schematics of FIGS. 5 and 6, the same reference numerals refer to the same parts throughout the various Figures.

DESCRIPTION OF THE PREFERRED EMBODIMENT

Figure 1:
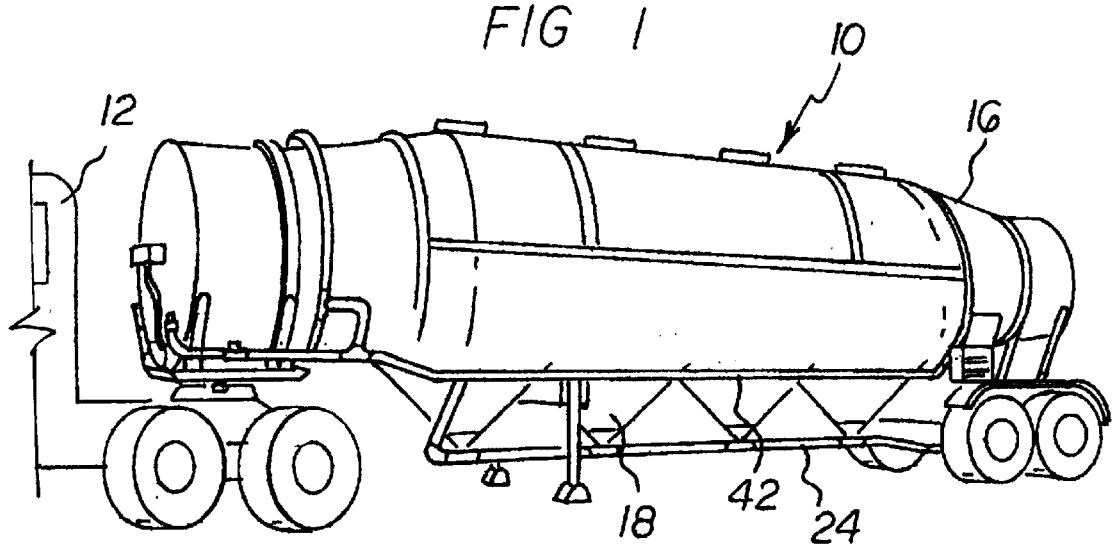
FIG. 1 is a perspective illustration of the tanker trailer of the automated tanker unloading system constructed in accordance with the principles of the present invention.
Figure 2:
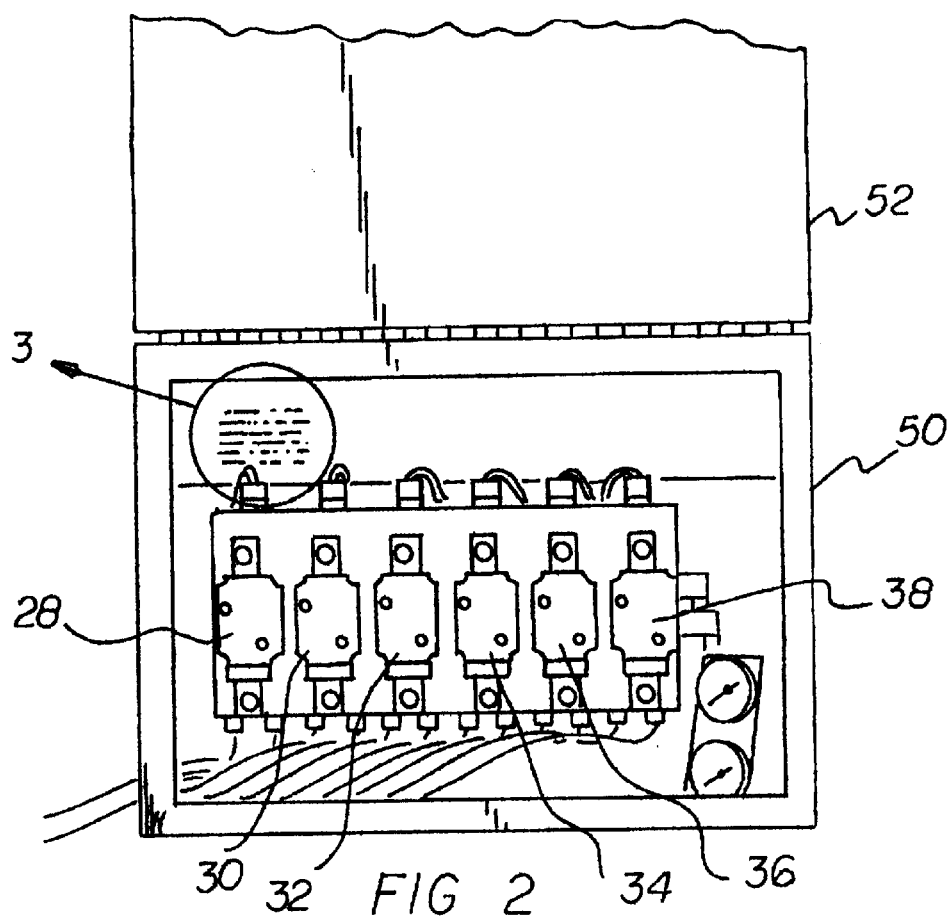
FIG. 2 is a plan view of the control box of the present invention.
Figure 3:
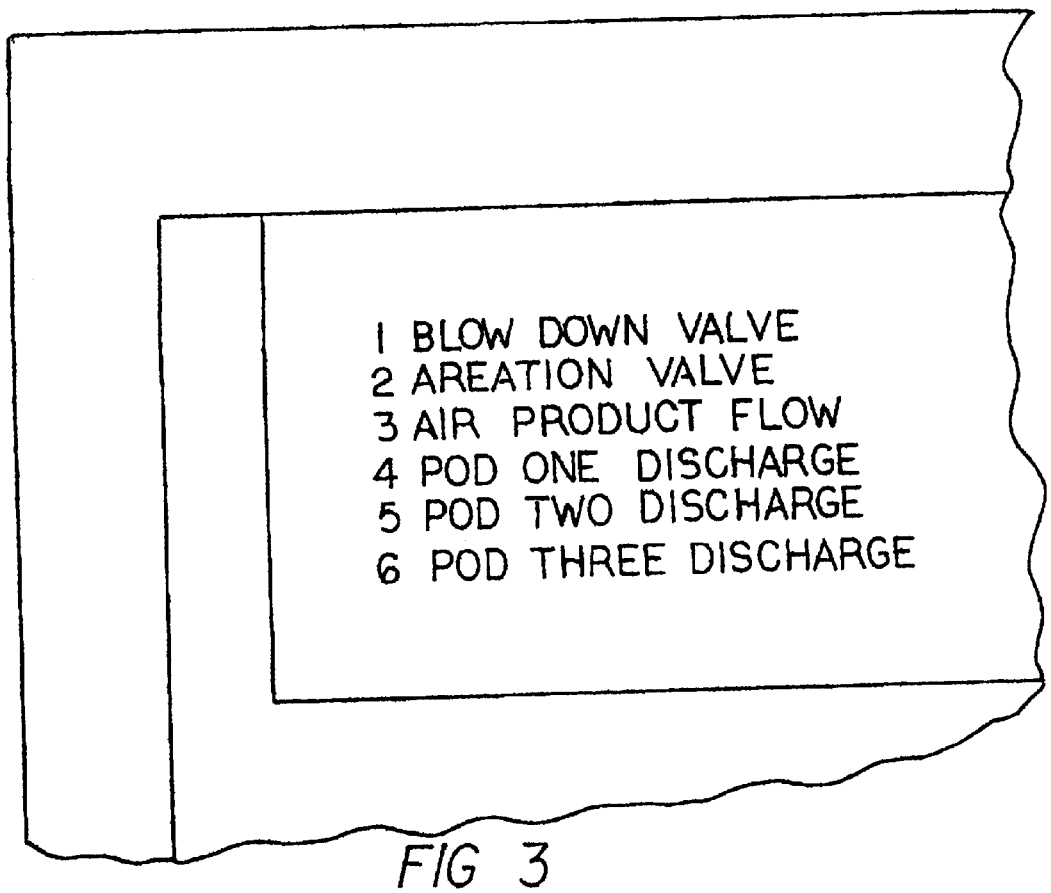
FIG. 3 is a enlarged view of circle 3 of FIG. 2 showing the indicia for valves.
Figure 4:
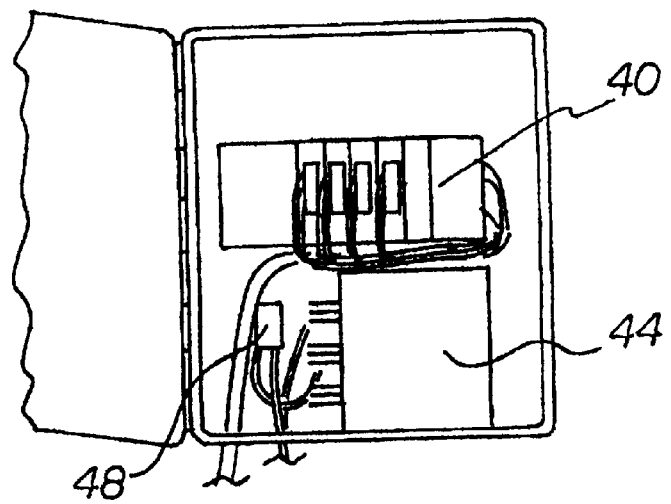
FIG. 4 is a plan view of the processor of the present invention shown in a protective housing.

With reference now to the drawings, and in particular to FIG. 1 thereof, the preferred embodiment of the new and improved automated tanker unloading system embodying the principles and concepts of the present invention and generally designated by the reference numeral 10 will be described.

The present invention, the automated tanker unloading system 10 is comprised of a plurality of components. Such components in their broadest context include a plurality of electronically controlled valves, a plurality of electronic gas pressure transducers, a plurality of pressure carrying pipes and a processor. Such components are individually configured and correlated with respect to each other so as to attain the desired objective.

First provided is a tractor 12. The tractor is equipped to provide airflow and pressure through a pressure feed pipe known as a hot hose 14.

A tanker trailer 16 is next provided. The trailer has a plurality of hoppers 18. The trailer is suited to haul dried granular material known as product. The trailer is equipped with a gas pressurization system for each of the plurality of hoppers 18 contained within the tanker. The tanker also has a discharge piping system, known as a product hose 24, for carrying the product from the hopper to a storage area.

First provided is a plurality of electronically controlled valves 28. The valves control gas pressure within a tanker trailer and control the delivery of the product. Each of the valves performs one function from a group of functions. The valves and their functions include a blow down valve 28, an aeration valve 30, an air product flow valve 32, and one of a plurality of hopper discharge valves 34, 36, 38.

A plurality of electronic gas pressure transducers 40 are next provided. The transducers sense internal gas pressure within the individual hoppers of the trailer and sense internal gas pressures within the hot hose and the product hose and convert the sensed gas pressure into an electronic signal.

Next provided are a plurality of pressure carrying pipes 42. The pipes transmit positive and negative pressures between the valves and the hoppers and the product hoses and the hot hose.

A processor 44 is next provided. The process is programmed to analyze electronically inputted data from the transducers and to then send signals to control the valve functions. The processor is shown in a protective housing.

An electronically coupling means 48 is next provided. The transducers and the processor are coupled allowing electronic signals from the transducers to be transmitted to the processor. The coupling means also couples the processor and the valves thereby allowing the processor to control the function of the valves according to the installed program in the processor.

Finally, a control box 50 is provided. The control box is fabricated of rigid material. The control box has five closed sides. The control box also has a pivotally mounted sixth side 52 for allowing the opening and closing of the control box. The box houses a plurality of components of the invention.

An optional display screen, not shown, may be incorporated in the invention. The display screen would be used to monitor the functions of the system.

Figure 5:
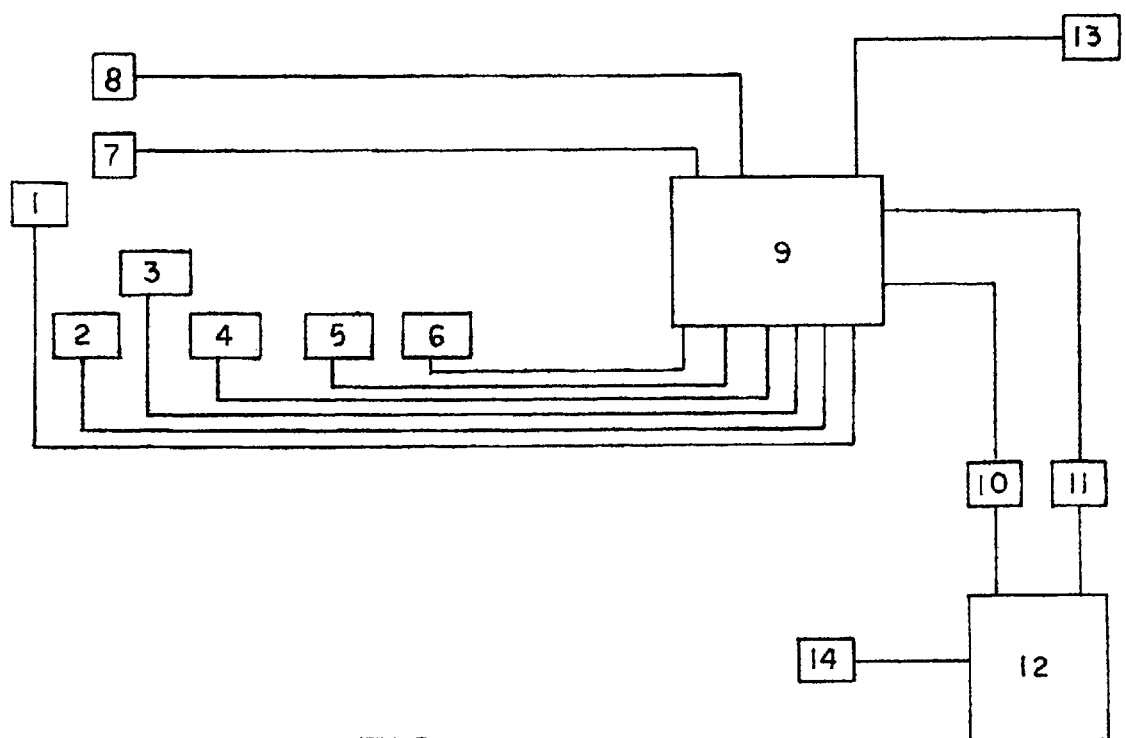
FIG. 5 is an electrical schematic for the present invention.

FIG. 5 shows the electrical system schematic for the present invention in which:

1. Blow down valve position switch. Connects to junction box 9 with 6-wire harness.
2. Aeration valve position switch. Connects to junction box 9 with 6 wire harness.
3. Air product flow valve position switch. Connects to junction box 9 with 6-wire harness.

4. Pod one discharge valve position switch. Connects to junction box 9 with 6-wire harness.
5. Pod two discharge valve position switch. Connects to junction box 9 with 6-wire harness.
6. Pod three discharge valve positions witch. Connects to junction box 9 with 6-wire harness.
7. Pod pressure transducer connects to junction box 9 with 3-wire harness.
8. Discharge pressure transducer connects to junction box 9 with 3-wire harness.
9. Junction box for wires connecting from position switches and pressure transducers to wires from PLC control box and the air solenoids.
10. Connector at rear of truck for 39-wire harness going from the junction box 9 to the PLC control box 12.
11. Connector at rear of truck for 2-wire power supply harness going between the junction box 9 and the PLC control box 12.
12. PLC control box which houses the 12 volt power supply to operate the trailer solenoid valves and the PLC control computer.
13. Discharge hose connect switch connected to the junction box 9 by a 2-wire harness.
14. Silo level switch that connects to the PLC control box 12 with a 2-wire harness.

Figure 6:
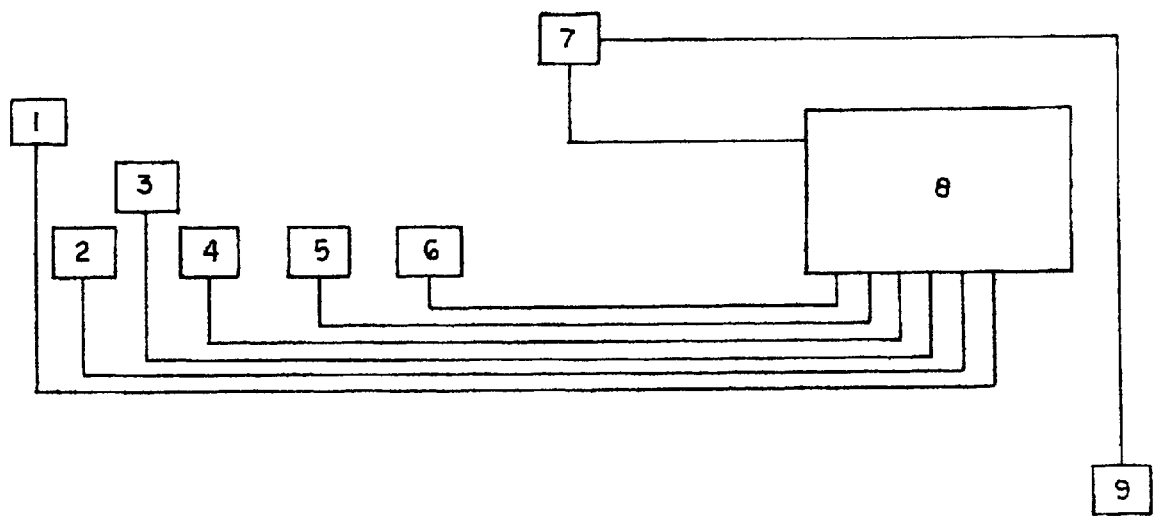
FIG. 6 is an air system schematic for the present invention.

FIG. 6 is an air system schematic for the present invention in which:

1. Blow down valve connects to control valve bank 8 with two plastic air lines.
2. Aeration valve connects to control valve bank 8 with two plastic air lines.
3. Air product flow valve connects to control valve bank 8 with two plastic air lines.
4. Pod one discharge valve connects to control valve bank 8 with two plastic air lines.
5. Pod two discharge valve connects to control valve bank 8 with two plastic air lines.
6. Pod three discharge valve connects to control valve bank 8 with two plastic air lines.
7. Air supply tank connects to control valve bank 8 with one plastic air line.
8. Air supply tank connects to external air supply with single plastic air line at connector 9.

A large variety of dry particulate materials are transported by truck today in what are called dry bulk pneumatic tankers. The unloading of these tankers requires human monitoring to make a number of logical decisions with consequential physical adjustment. These are to initiate the unloading, maintain efficient unloading pace, decide when individual unloading compartments are empty and switch compartments accordingly, resolve instances of plugging-up, too much material collecting somewhere in the discharge line that prevents unloading, and end the unloading procedure. Some of these logical decisions and physical adjustments can be performed by the present invention.

The present invention is a logic circuit with a computer programmed routine that controls air driven valves in response to pressure reading feedback from the tanker it is unloading. Parts of a pneumatic tanker include a blower, a mechanical device attached to the truck's transmission that creates an airflow. A hot hose is the hose that connects between the blower and tank's aeration system providing airflow and pressure to the banker. A silo, not illustrated, is a storage device for materials that must stay dry. A product hose is the hose that connects the tanker's discharge piping to the silo so the particulate material may be conveyed between the two. Product valves are the valves that separate the material compartments and the discharge piping. The secondary purpose of this valve is to, when necessary, remove material from the discharge pipes. The air valve to the tanker's primary purpose is to control the amount of air that is introduced to the material compartments. It also has a secondary purpose that when necessary it will allow pressure to escape from the material compartments. The air valve to discharge piping controls the amount of air introduced to the discharge piping. Manipulation of this valve determines how much air is used to push material through the discharge. The air valve to pressure relief controls the amount of air that is permitted to escape from the aeration system. It's primary use is to remove all pressure from the tank when the unloading is finished. A secondary use is to, when necessary, produce a vacuum to remove material from the discharge pipes. The hatch is the opening on top of a tanker that allows it to be loaded quickly at loading facilities. A tank gauge tells the air pressure within the material compartments. It is typically near the middle or rear end of a tanker on the side with the valves. The line gauge tells the air pressure within the discharge pipes.

Without the use of the present invention, the procedure for unloading a tanker is as follows:

1. Connect:
   a. Hook up hot hose to tanker.
   b. Hook up product hose to silo.
   c. Product valves are closed.
   d. Air valve to tanker is 100 percent open.
   e. Air valve to discharge piping is closed.
   f. Air valve to pressure relief is closed.
   g. Hatch on top is closed.
   h. Gauges are at "O".
2. Unloading:
   a. Start blower.
   b. When tank gauge indicated 9 lbs, then:
   c. Open product air valve to 50%.
   d. If the line gauge indicates more than 2 lbs., then:
   e. Open product air valve to 100% until the line gauge indicated 2 lbs. or less for 5 seconds, then:
   f. Open product air valve to 50 percent.
   g. If line gauge indicates 2 lbs. or less for 5 seconds, then:
   h. Open the product valve on the front pod 100 percent.
   i. The line gauge should indicate within 1 lb. of the tank gauge.
   j. At this point the product will start to flow.
   k. Monitor the line gauge to stay at 10 lbs.
   l. If the line gauge goes to 12 lbs, then:
   m. Open product air valve to 100 percent for 10 seconds or if the line gauge starts to decrease to 10 lbs., then:
   n. If the line gauge does not decrease, then close all three product valves and keep the product air valve open 100 percent.
   o. If the line gauge still does not decrease, then close the air valve to the tank.
   p. If the line gauge still does not decrease, then open the blow down valve slowly until tank gauge indicated 5 lbs. or less. Once at 5 lbs. or less, then:
   q. Open the front product valve until the line gauge indicates 2 lbs. or less or for 10 seconds, then close for 10 seconds. If the line gauge starts to decrease go to step "r" below. If the line gauge does not start to decrease, open the center product valve until the tank gauge indicated 2 lbs. or less for 15 seconds, then close for 1 seconds. If the line gauge indicates to decrease, go to step "r". If not, repeat the center pod. Then, if not clear go to the rear pod open until tank line gauge indicates 2 lbs. or less or 20 seconds, then close the rear pod valve for 20 seconds or until the line gauge indicates 2 lbs. or less. If not, repeat the rear pod sequence.

r. Keep air product valve open and tank air valve closed and close the blow down valve when the line gauge indicates 10 lbs. Then open the air valve to the tank 100 percent open the air valve to the product line to 50 percent and open the front product valve 10 percent ad continue to unload if the line gauge indicates 6 lbs., then:

s. Close the air product valve to 10 percent, leave the front product valve open 100 percent, and open the center product valve to 75 percent and monitor the gauges for line pressure to maintain 10 lbs. until the line gauge indicates 6 lbs., then:

t. Close the air product valve to 10 percent, close the front product valve to 10 percent, center product valve at 50 percent, and open the rear product valve 100 percent, and monitor the gauges to maintain 10 lbs. line pressure until line gauge indicates 6 lbs. or less, then:

u. Open all product valves and air product valve for 5 seconds. Then close with product valves open for 60 seconds. If pressure indicates 2 lbs. or less then empty. Continue for 2 minutes, then open blow down valve for 1 minutes. Then, stop blower.

3. Disconnect:
  a. Unhook product discharge line.
  b. Unhook hot hose.
  c. Close front, center and rear product valves.
  d. Close air product valve.

The procedure, though logical, requires training to take in the cues from the gauges and respond properly. In an ideal situation with a well skilled person at the controls the "unplugging procedure" represented by steps "Unloading o through 4" can be completely avoided. Improper response to increasing pressure represented in "Unloading 1 through n" increases the likelihood of a plug-up. Failure to maintain a pressure close to 10 lbs. results in longer than necessary unload time. In addition to avoiding these logical errors, use of the automated tanker unloading system of the present invention frees up the operator to perform other tasks, thus increasing overall efficiency.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. An automated tanker unloading system to allow a user to safely and efficiently control tanker unloading comprising, in combination:

a tractor equipped to provide airflow and pressure through a pressure feed pipe known as a hot hose;

a tanker trailer having a plurality of hoppers, with the trailer being suited to haul dried granular material known as product with the trailer equipped with a gas pressurization system for each of the plurality of hoppers contained within the tanker, with the tanker also having a discharge piping system known as a product hose for carrying the product from the hopper to a storage area;

a plurality of electronically controlled valves to control gas pressure within a tanker trailer and to control the delivery of the product, with each of the valves performing one of the functions from the group of functions including a blow down valve and an aeration valve and an air product flow valve and one of a plurality of hopper discharge valves;

a plurality of electronic gas pressure transducers to sense internal gas pressure within the individual hoppers of the trailer and to sense the internal gas pressures within the hot hose and the product hose and convert the sensed gas pressure into an electronic signal;

a plurality of pressure carrying pipes for transmitting positive and negative pressures between the valves and the hoppers and the product hoses and the hot hose;

a processor being programmed to analyze electronically inputted data from the transducers and to then send signals to control the valve functions;

an electronically coupling means by which the transducers and the processor are coupled allowing electronic signals from the transducers to be transmitted to the processor and said coupling means also coupling the processor and the valves thereby allowing the processor to control the function of the valves according to the installed program in the processor by said coupling electronic means; and, a control box fabricated of rigid material having five closed sides and a pivotally mounted sixth side for allowing the opening and closing of the control box, with the box housing a plurality of components.

2. An automated tanker unloading system comprising, in combination:

a plurality of electronically controlled valves to control gas pressure within a tanker trailer and to control the delivery of a product, with each of the valves performing one of the functions from a group of valve functions;

a plurality of electronic gas pressure transducers to sense internal gas pressure within individual hoppers of the trailer and to sense internal gas pressures within a hot hose and a product hose and convert the sensed gas pressure into an electronic signal;

a plurality of pressure carrying pipes for transmitting positive and negative pressures between the valves and the hoppers and the product hoses and the hot hose; and a processor being programmed to analyze electronically inputted data from the transducers and to then send signals to control the valve functions.

* * * * *